(12) United States Patent
Sawada

(10) Patent No.: US 12,363,242 B2
(45) Date of Patent: Jul. 15, 2025

(54) COMMUNICATION APPARATUS AND METHOD FOR MANAGING COMMUNICATIONS BETWEEN DIFFERENT NETWORKS

(71) Applicant: CANON KABUSHIKI KAISHA, Tokyo (JP)

(72) Inventor: Tetsuya Sawada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/330,095

(22) Filed: Jun. 6, 2023

(65) Prior Publication Data
US 2023/0403364 A1    Dec. 14, 2023

(30) Foreign Application Priority Data
Jun. 8, 2022    (JP) ................................ 2022-092798

(51) Int. Cl.
    *H04W 8/00*      (2009.01)
    *H04N 1/327*     (2006.01)
    *H04W 76/14*     (2018.01)

(52) U.S. Cl.
    CPC ........ *H04N 1/32747* (2013.01); *H04W 8/005* (2013.01); *H04W 76/14* (2018.02)

(58) Field of Classification Search
    CPC ........ H04N 1/327; H04W 8/00; H04W 76/14; G06F 3/121; G06F 3/1226; G06F 3/1231; G06F 3/1261; G06F 3/1291
    See application file for complete search history.

(56) References Cited

U.S. PATENT DOCUMENTS

| 2014/0287690 | A1* | 9/2014  | Kim ........................ H04W 4/80 455/41.1 |
| 2015/0296450 | A1* | 10/2015 | Koo ....................... H04W 48/16 455/435.3 |
| 2018/0184366 | A1* | 6/2018  | Asakura ................ H04W 76/10 |
| 2018/0351854 | A1* | 12/2018 | Iwauchi .................. H04L 45/22 |
| 2022/0159766 | A1* | 5/2022  | Osaki ..................... G06F 3/1236 |

FOREIGN PATENT DOCUMENTS

| JP | 2016174295 A | 9/2016 |
| JP | 6242241 B2   | 12/2017 |
| JP | 2019009888 A | 1/2019 |
| JP | 2021040176 A | 3/2021 |

* cited by examiner

*Primary Examiner* — Juan M Guillermety
(74) *Attorney, Agent, or Firm* — Canon U.S.A., Inc., IP Division

(57) ABSTRACT

A communication apparatus includes at least one memory storing instructions, and at least one processor that, upon execution of the instructions, is configured to: wait for connections from other communication apparatuses to a first network built by the communication apparatus, acquire connection information from a first other communication apparatus connected to the first network, search for a second network built by other communication apparatuses, acquire connection information from a second other communication apparatus found in the search, connect to a connection destination indicated by the connection information from the first other communication apparatus and the second other communication apparatus, and wherein the communication apparatus is controlled to switch between waiting for connections and searching for the second network.

9 Claims, 7 Drawing Sheets

COMMUNICATION APPARATUS AND METHOD FOR MANAGING COMMUNICATIONS BETWEEN DIFFERENT NETWORKS

BACKGROUND

Field

The present disclosure relates to a communication apparatus that performs wireless communication.

Description of the Related Art

There are known communication apparatuses such as printers that communicate with terminal apparatuses such as personal computers (PCs) and smartphones. Such a communication apparatus executes a connection setting process for communicating with terminal apparatuses by a predetermined communication method such as Wi-Fi, for example.

Japanese Patent No. 6242241 discusses that, in order for a first communication apparatus to establish a connection with a second communication apparatus, the first communication apparatus acquires the information about a network built by the second communication apparatus, from another communication apparatus that has established a connection with the second communication apparatus.

In the connection method described above, in order for the first communication apparatus to establish a connection with the second communication apparatus, there needs to be another communication apparatus that has recognized information about the network built by the second communication apparatus. However, if there is no communication apparatus that has recognized the information about the network of the partner apparatus with which a connection is to be established, the first communication apparatus may not be able to acquire the information for connection with the partner apparatus.

SUMMARY

Thus, an object of the present disclosure is to allow a communication apparatus to appropriately acquire information about a network for the communication apparatus to connect with a partner apparatus, even when there is no other communication apparatus that has recognized information about the network, which is the connection destination.

According to an aspect of the present disclosure, a communication apparatus includes at least one memory storing instructions, and at least one processor that, upon execution of the instructions, is configured to: wait for connections from other communication apparatuses to a first network built by the communication apparatus, acquire connection information from a first other communication apparatus connected to the first network, search for a second network built by other communication apparatuses, acquire connection information from a second other communication apparatus found in the search, connect to a connection destination indicated by the connection information from the first other communication apparatus and the second other communication apparatus, and wherein the communication apparatus is controlled to switch between waiting for connections and searching for the second network.

Further features of the present disclosure will become apparent from the following description of exemplary embodiments with reference to the attached drawings.

DESCRIPTION OF THE EMBODIMENTS

Figure 1:
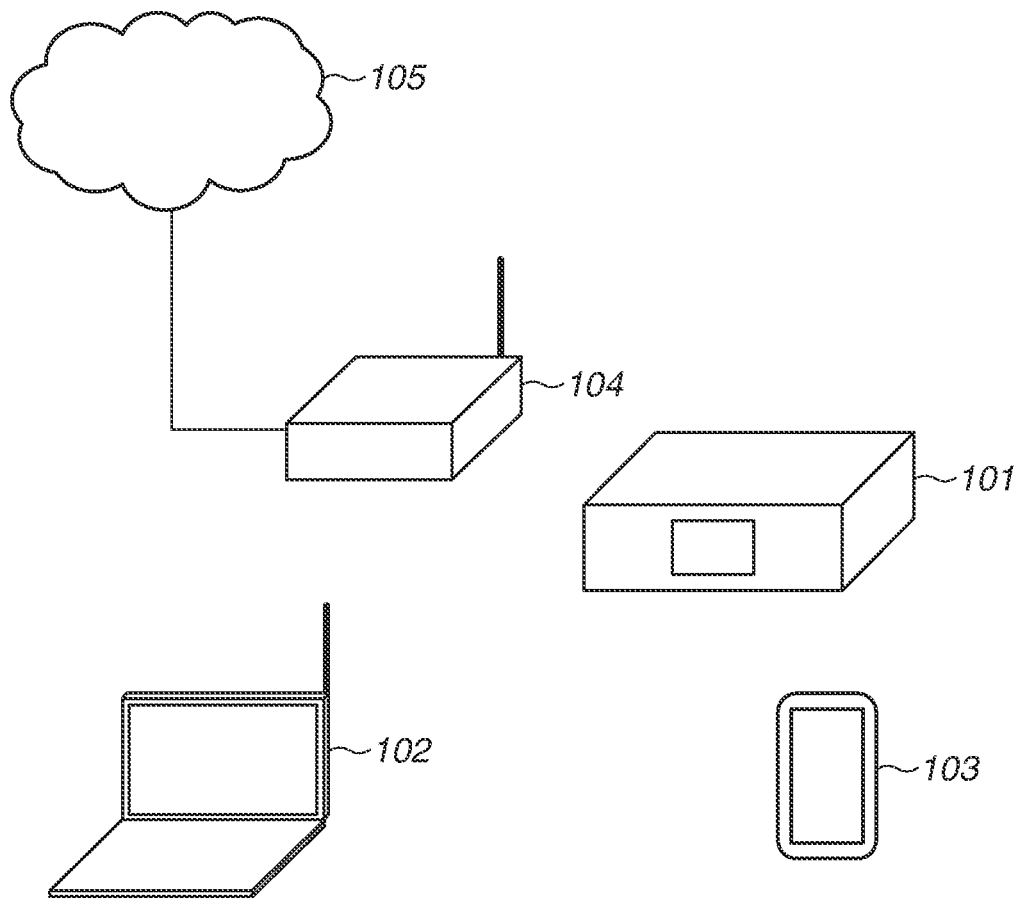
FIG. 1 is a diagram illustrating a configuration of a network in exemplary embodiments.

Hereinafter, exemplary embodiments of the present disclosure will be described in detail with reference to the drawings. Configurations in the following exemplary embodiments are mere examples and the present disclosure is not limited to the configurations illustrated in the drawings.

FIG. 1 is a diagram illustrating a configuration of a network in exemplary embodiments. Referring to FIG. 1, a communication apparatus 104 is an access point (AP) that has the role of building a communication network, and a communication apparatus 101 is a station (STA) that participates in the communication network built by the AP to perform communication.

A communication apparatus 102 is a personal computer (hereinafter, called PC), a communication apparatus 103 is a smart device, and a communication apparatus 104 is a wide area network (hereinafter, called WAN). The communication apparatus 103 has the function of autonomous group owner (AGO), and is a tablet having a structure in which a PC, a smartphone, and a Wi-Fi router are integrated, for example.

The network built by the communication apparatus 104 is connected to a WAN 141 with the communication apparatus 104 functioning as a gateway.

The communication apparatus 101 has a plurality of STA functions. In a first STA function, the communication apparatus 101 can establish a connection with the AP to perform communication, and in second STA function in parallel, the communication apparatus 101 can establish a connection with a group owner (GO) by a client function under Wi-Fi Direct standards to perform communication.

The communication apparatus 101 also has a cableless setup mode. The cableless setup mode is a dedicated mode in which wireless setting of wireless infrastructure communication is enabled. In the cableless setup mode, the communication apparatus 101 is activated as a software AP mode and operated as a leader station (master station). The software AP activated at this timing is a leader station in the cableless setup mode. Accordingly, external communication apparatuses such as personal computers, smartphones, and tablets can connect to the communication apparatus 101 as clients (follower stations, slave station) and communicate with the communication apparatus 101. In the cableless setup mode, the use of the software AP mode is not necessarily required, and a Wi-Fi Direct mode may be used instead of the software AP mode. However, in the case of using the Wi-Fi Direct mode, a network identifier, service set identifier (SSID), needs to include a randomly generated character string. An application dedicated to local area network (LAN) setting running on external devices such as personal computers, smartphones, and tablets allows users with little knowledge of LAN to easily connect to the communication apparatus 101. By using the LAN setting-dedicated application, information necessary for connection is sent to the STA 101 without the user knowing the details of settings.

Figure 2:
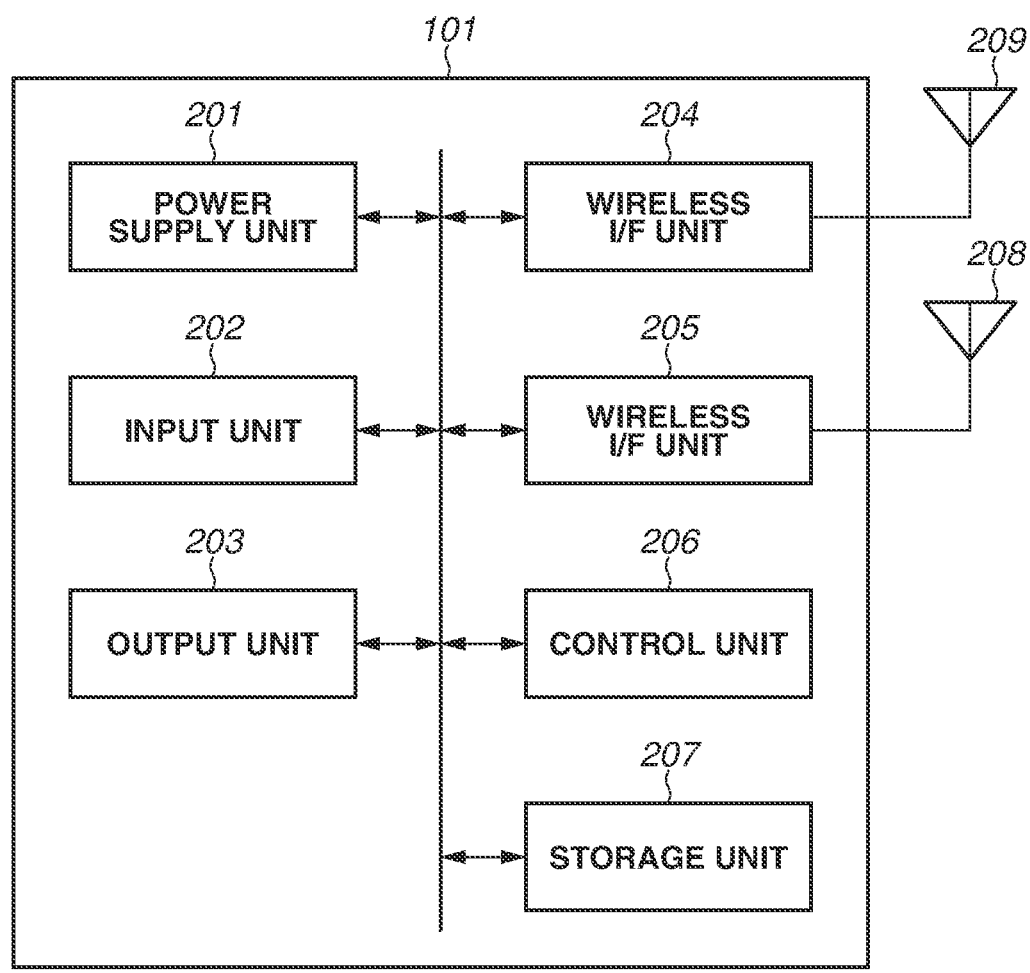
FIG. 2 is a diagram illustrating a hardware configuration of a communication apparatus.

FIG. 2 illustrates a hardware configuration of the STA 101. The STA 101 includes a power supply unit 201, an input unit 202, an output unit 203, a wireless interface unit 204 (hereinafter, wireless I/F unit), a wireless I/F unit 205, a control unit 206, a storage unit 207, antennas 208 and 209.

The power supply unit 201 supplies power to the hardware units. The power supply unit 201 acquires power from an AC power source or a battery.

The input unit 202 accepts various operations from the user. The input unit 202 includes buttons, for example.

The output unit 203 makes various outputs to the user. Examples of outputs from the output unit 203 include display on light-emitting diode (LED) displays, display on a screen, sound output from a speaker, vibration output, and others. The input unit 202 and the output unit 203 may be implemented as one module such as a touch panel. The input unit 202 and the output unit 203 may be integrated with or separated from the STA 101.

The wireless I/F unit 204 and the wireless I/F unit 205 perform wireless LAN control compliant with IEEE802.11 standard and Wi-Fi standards, and transmit and receive radio waves. The wireless I/F unit 204 and the wireless I/F unit 205 can also selectively activate the STA function, the AP function, and the CL function. The STA 101 can operate the two wireless I/F units in parallel and can connect to up to two wireless communication apparatuses performing the AP or GO function. In the present exemplary embodiment, the two wireless I/F units are provided to perform the first STA function and the second STA function, but the number of the wireless I/F units is not limited to two.

The control unit 206 includes a processor such as a central processing unit (CPU) or a micro processing unit (MPU), an application specific integrated circuit (ASIC), a digital signal processor (DSP), and a field programmable gateway (FPGA).

The control unit 206 controls the entire AP and STA by executing programs stored in the storage unit 207. The control unit 206 may control the entire AP and STA by cooperation between the programs stored in the storage unit 207 and the operating system (OS).

The storage unit 207 is formed of a memory such as a read only memory (ROM) or a random access memory (RAM) and stores programs for performing various processes described below and various types of information. As the storage unit 207, in addition to the ROM or RAM, a storage medium such as a flexible disk, a hard disk, an optical disk, a magneto-optical disk, a CD-ROM, a CD-R, a magnetic tape, a non-volatile memory card, or a DVD may be used. The storage unit may include a plurality of memories or the like.

The antennas 208 and 209 are antennas that are capable of communication at a 2.4-GHz band, a 5-GHz band, and a 6-GHz band. In the present exemplary embodiment, the STA 101 has two antennas. However, the present disclosure is not limited to this. The STA 101 may have a different antenna for each frequency band. If the STA 101 has a plurality of antennas, the STA 101 may have wireless OF units in correspondence with the antennas.

In the first exemplary embodiment, the AP function and CL function (or STA function) of the STA 101 are activated in sequence at the time of cableless setup so that the STA 101 receives information necessary for establishing a connection with a partner apparatus, as an example. The AP function activated here is a leader station in the cableless setup mode.

Figure 3:
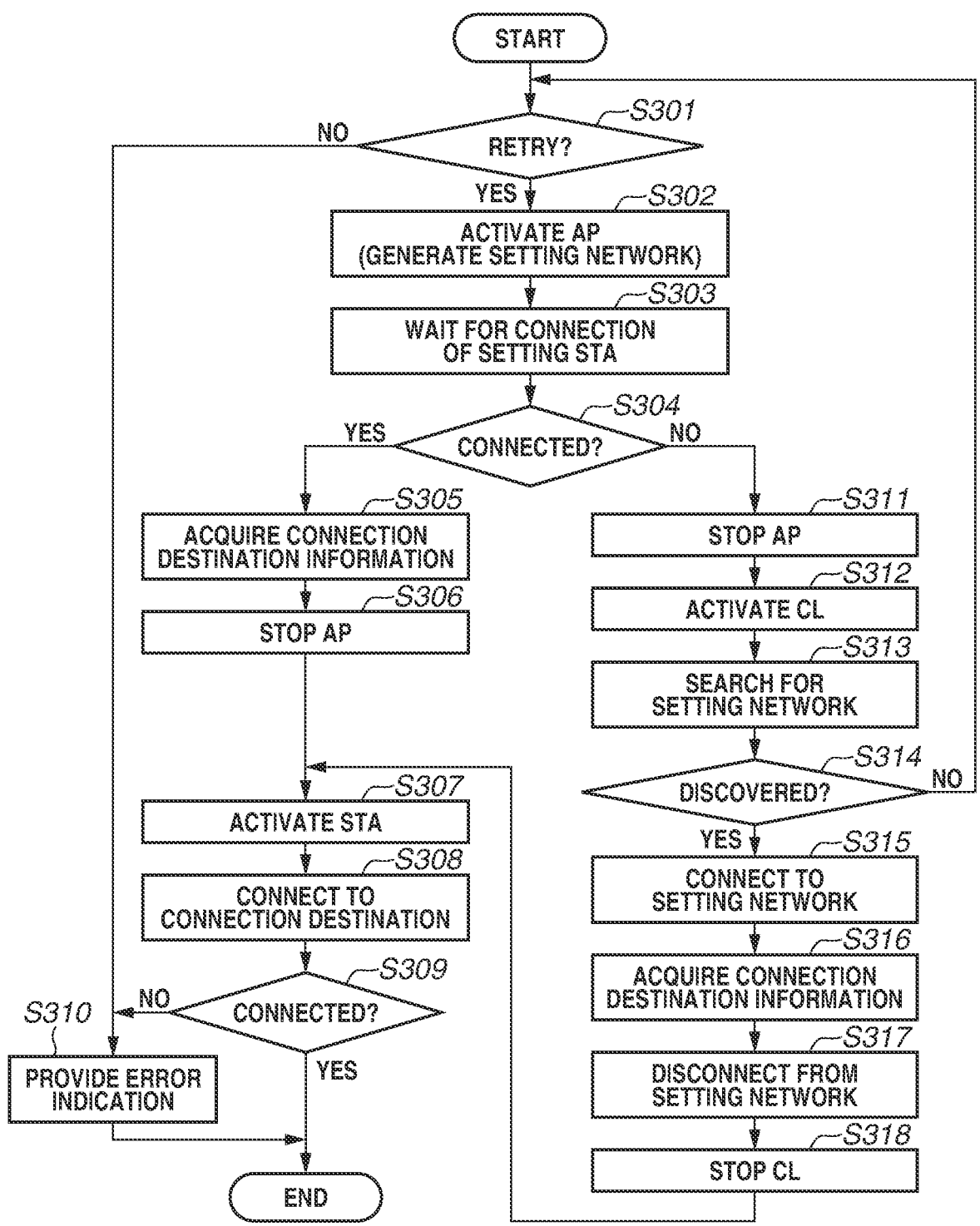
FIG. 3 is a flowchart of a process executed by a communication apparatus in a first exemplary embodiment.

FIG. 3 is a flowchart of a process performed by the control unit 206 executing a program stored in the storage unit 207 of the STA 101.

The process in this flowchart is started when the user operates the input unit 202 to select a connection destination setting menu.

When the process is started, in step S301, the control unit 206 determines whether to try a cableless setup process. In step S301, the control unit 206 tries the process a predetermined number of times until the setting is completed.

In the case of trying the cableless setup process while the predetermined number of times is not yet reached, in step S302 (YES in step S301), the control unit 206 activates the AP function. In step S302, the control unit 206 activates the AP function of the STA 101 to form a cableless setup network with a predetermined SSID, in order to receive AP or GO information about a partner apparatus, which is the connection destination, from the STA 101. In step S303, the control unit 206 waits a certain period of time until the STA 101 connects to the cableless setup network formed in step S302 for acquiring the information about the partner apparatus, which is the connection destination.

Next, in step S304, the control unit 206 determines whether the STA 101 has established a connection with the STA 103 in the cableless setup network. In step S304, if the control unit 206 determines that the STA 101 has established a connection with the STA 103 (YES in step S304), in step S305, the control unit 206 acquires the information about the AP or GO, which is the connection destination, from the STA 103. The information about the connection destination acquired in step S305 is the SSID and password of the AP or GO.

After acquiring the information about the connection destination in step S305, in step S306, the control unit 206 stops the AP function for building a cableless setup network. In step S307, the control unit 206 activates the STA function to connect to the AP or GO, which is the connection destination. If it can be determined that the connection destination is the GO based on the SSID or the like in the information about the connection destination acquired in step S305, the control unit 206 may activate the CL function instead of activating the STA function to connect to the connection destination. After activating the STA function in step S307, in step S308, the control unit 206 sets the information about the connection destination received from the STA 103 to the STA function and then tries connection to the connection destination (S308).

Next, in step S309, the control unit 206 determines whether the connection to the connection destination has succeeded. If the control unit 206 determines in step S309 that the connection has succeeded (YES in step S309), the process is ended. If the control unit 206 determines in step S309 that the connection has not succeeded (NO in step S309), in step S310, the control unit 206 provides an error indication that the setting has not completed, and the process is ended.

On the other hand, in step S304, if no connection has been established after a lapse of a certain period of time and a timeout occurs (NO in step S304), in step S311, the control unit 206 stops the AP function, and in step S312, the control unit 206 activates the CL function. In step S313, the control unit 206 searches for a cableless setup network with a predetermined cableless setup SSID formed by another apparatus as the GO. In step S314, the control unit 206 determines whether the cableless setup network formed by another apparatus as the GO has been discovered. If the cableless setup network has been discovered (YES in step S314), in step S315, the control unit 206 connects to the cableless setup network formed by the GO, and in step S316, the control unit 206 acquires information about the GO, which is the connection destination.

After acquiring in step S316 the information about the network, which is the connection destination, in step S317, the control unit 206 disconnects from the connected cableless setup network, and in step S318, the process proceeds to step S307.

If the control unit 206 is unable to discover the cableless setup network formed by another apparatus, which is the GO, and a timeout occurs in step S314 (NO in step S314), in step S301, the control unit 206 determines whether to retry, and in step S302, the control unit 206 activates the AP function again and performs the above-described steps.

In the present exemplary embodiment, as an example, the AP function is activated first at the time of cableless setup, and if the network information about the connection destination cannot be received, then the STA function is activated. However, the present disclosure is not limited to this. For example, the STA function may be activated first, and if the network information cannot be received, then the AP function may be activated.

According to the present exemplary embodiment, since the AP function and the CL function are activated in sequence at the time of cableless setup, it is possible to acquire the information about the network for connection with the partner apparatus even if there is no communication apparatus that has recognized the information about the network, which is the connection destination.

Figure 4:
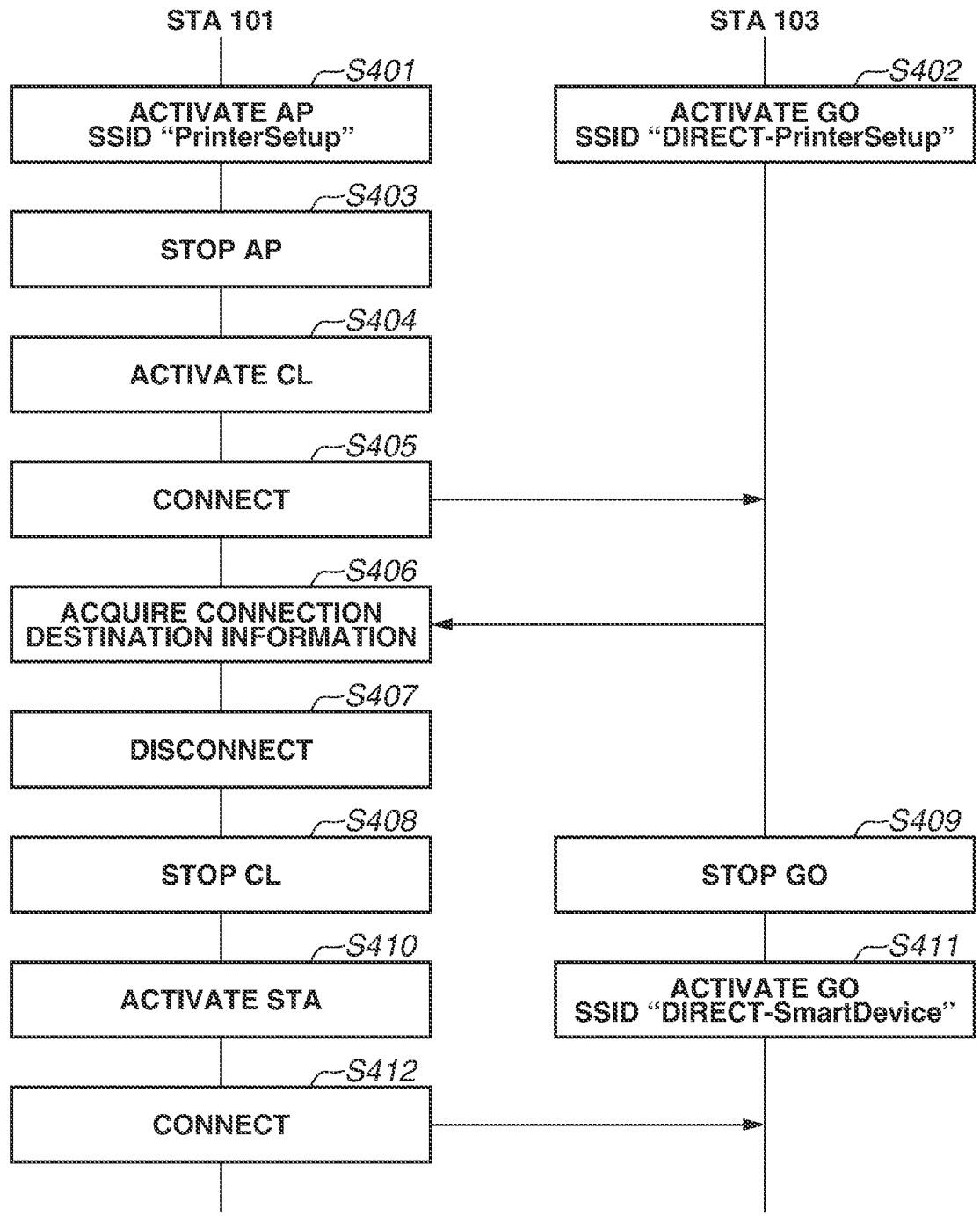
FIG. 4 is a sequence diagram related to the first exemplary embodiment.

FIG. 4 illustrates an example of operation sequence for the STA 101 in the present exemplary embodiment to receive the information about the network, which is the connection destination. FIG. 4 illustrates a sequence in the case where connection cannot be made to the STA for setting in the cableless setup network built by the STA 101 in step S304 in FIG. 3.

In step S401, in response to a user operation, the STA 101 activates the AP function to form a network with SSID of PrinterSetup as a cableless setup network. In step S402, in response to a user operation, the STA 103 forms a network with SSID of DIRECT-PrinterSetup as a cableless setup network.

The STA 101 waits a certain period of time for STA connection in the cableless setup network. Since the STA 101 has not established a connection with another apparatus in the cableless setup network, in step S403, the STA 101 stops the AP function, and in step S404, the STA 101 activates the CL function. After activating the CL function in step S404, the STA 101 searches for a cableless setup network formed by the GO. If the STA 101 discovers the cableless setup network, in step S405, the STA 101 connects to the network. In step S406, the STA 101 acquires information about the network with SSID of DIRECT-SmartDevic from the STA 103. After receiving the information about the connection destination, in step S407, the STA 101 disconnects from the network with SSID of DIRECT-PrinterSetup, and in step S408, the STA 101 stops the CL function. In step S409, the STA 103 stops the GO that has formed the cableless setup network, and closes the cableless setup network. In step S410, the STA 101 activates the STA function to connect to the connection destination. In step S411, the STA 103 activates the GO for establishment of a connection to form a network with SSID of DIRECT-SmartDevice. In step S412, the STA 101 sets the acquired information about the connection destination, and connects to the network with SSID of DIRECT-SmartDevice.

In the present exemplary embodiment, in steps S302 and S312, the AP function and the CL function are activated in this order. Alternatively, the CL function and the AP function may be activated in sequence in this order to receive information about the connection destination.

In the first exemplary embodiment, as an example, the AP function and the CL function of the STA 101 are activated in sequence at the time of cableless setup to receive the information about the network, which is the connection destination. In a second exemplary embodiment, an AP function and a CL function (or STA function) are activated in parallel to receive and set information about the connection destination. The AP function activated here is a leader station in a cableless setup mode.

Figure 5:
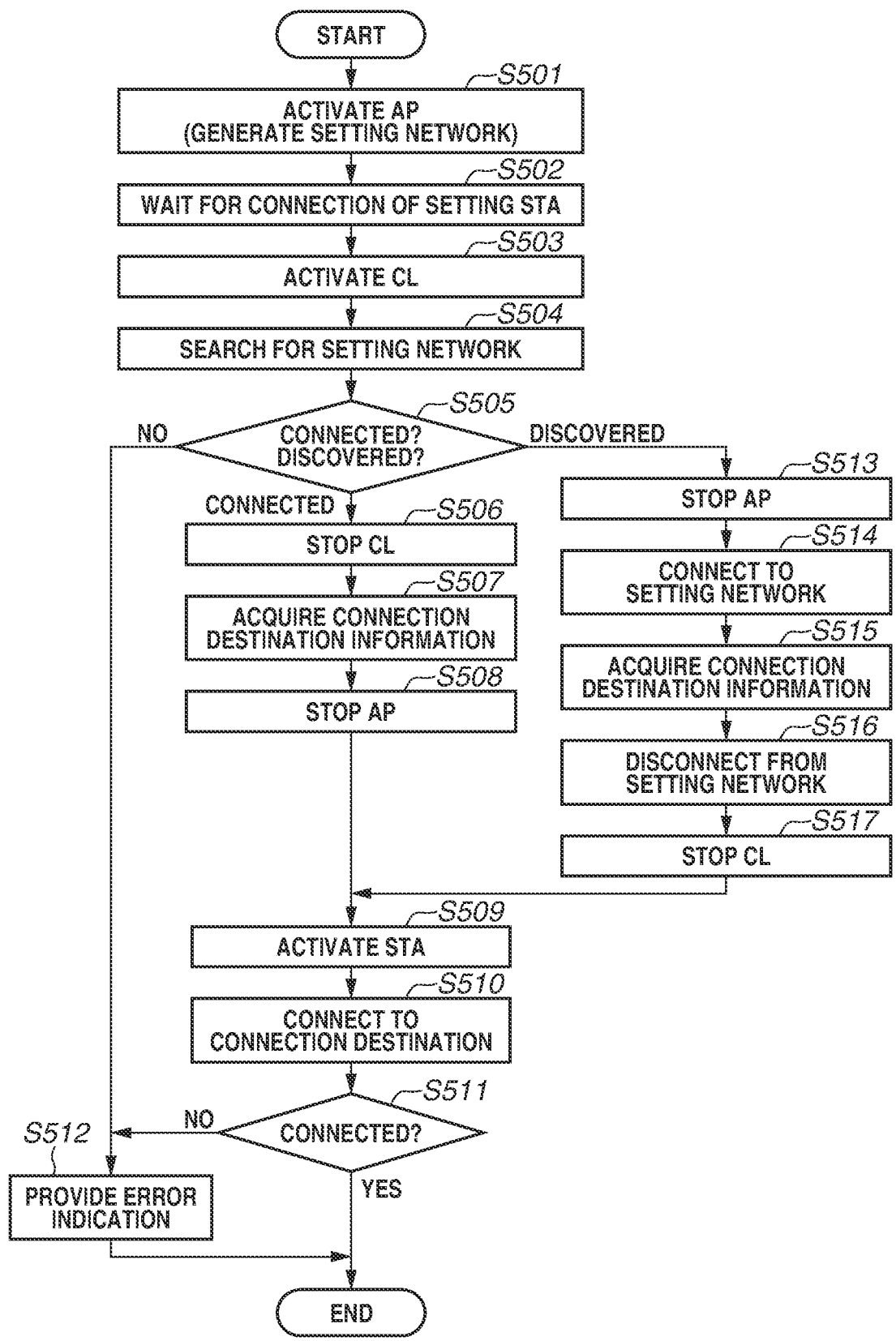
FIG. 5 is a flowchart of a process executed by a communication apparatus in a second exemplary embodiment.

FIG. 5 is a flowchart of a process performed by a control unit 206 executing a program stored in a storage unit 207 of an STA 101. The process in the flowchart is started when the user operates an input unit 202 to select a connection destination setting menu. When the process is started, in step S501, the control unit 206 activates the AP function to form a cableless setup network. In S501, the control unit 206 forms a cableless setup network with a predetermined cableless setup SSID by the AP function in order to receive information about the AP or GO, which is the connection destination. In step S502, the control unit 206 waits a certain period of time for the STA to connect to the network. In step S503, the control unit 206 activates the CL function. In step S503, the control unit 206 activates the CL function in parallel to the activation of the AP function. After activating the CL function in step S503, in step S504, the control unit 206 searches for a cableless setup network formed by another apparatus as the GO.

Next, in step S505, the control unit 206 determines whether the STA has connected to the cableless setup network or whether the cableless setup network formed by another apparatus as the GO has been discovered. If it is determined that connection with the STA in the cableless setup network has succeeded (YES in step S505), in step S506, the control unit 206 stops the CL function, and in step S507, the control unit 206 acquires information about the AP or the GO, which is the connection destination. The information about the connection destination acquired in step S507 is the SSID and password of the AP or the GO. When the information about the connection destination is acquired in step S504, in step S508, the control unit 206 stops the AP function, and in step S509, activates the STA function in order to connect to the AP or GO, which is the connection destination. If it can be determined that the connection destination is GO from the SSID or the like in the information about the connection destination acquired in step S507, the control unit 206 may activate the CL function instead of activating the STA function to connect to the connection destination.

When the STA function is activated in step S509, in step S510, the control unit 206 sets the information about the connection destination received from the STA in step S507 to the STA function, and tries to make a connection to the connection destination. Next, in step S511, the control unit 206 determines whether the connection to the connection destination has succeeded. If the control unit 206 determines in step S511 that the connection has succeeded (YES in step S511), the process in the flowchart is ended. If the control unit 206 determines in step S511 that the connection has not succeeded (NO in step S511), in step S512, the control unit 206 provides an error indication that the setting has not completed, and the process in the flowchart is ended.

On the other hand, if the cableless setup network formed by another apparatus was discovered in step S505, in step S513, the control unit 206 stops the AP function. In step S514, the control unit 206 connects to the cableless setup network formed by the GO, and in step S515, the control unit 206 acquires from the GO information about the GO, which is the connection destination.

Next, in step S516, the control unit 206 disconnects from the connected cableless setup network, then in step S517, the control unit 206 stops the CL function, and then the process proceeds to step S509.

If the control unit 206 determines in step S505 that the STA has not connected to the cableless setup network and the cableless setup network formed by another apparatus, which is the GO, has not been discovered after a lapse of a certain period of time (NO in step S505), in step S512, the control unit 206 provides an error indication. When the control unit 206 provides the error indication in step S512, the process in the flowchart is ended.

According to the present exemplary embodiment, activating the AP function and the CL function in parallel at the time of cableless setup makes it possible to acquire network information for connection to the partner apparatus even when there is no communication apparatus that has recognized the network information.

Figure 6:
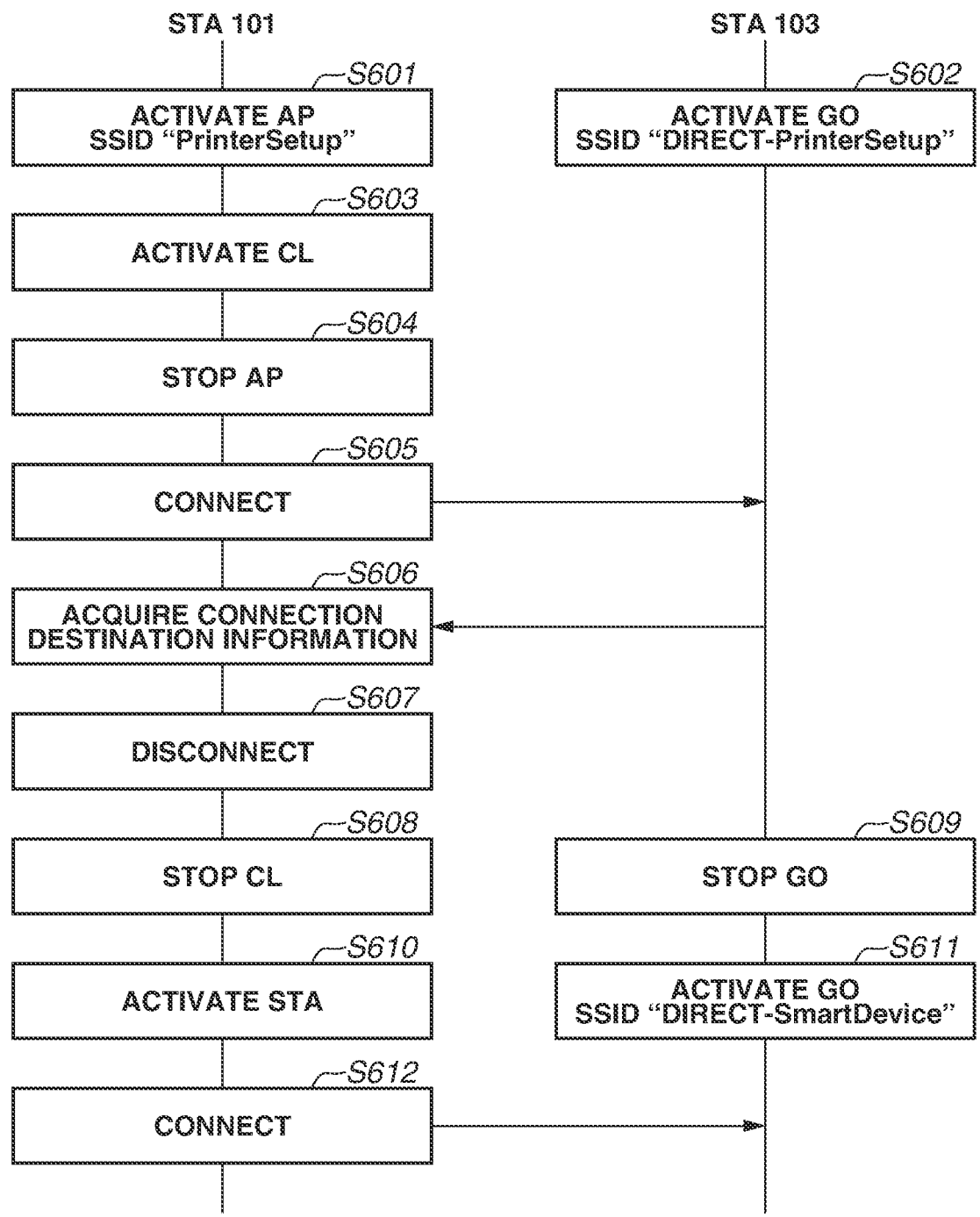
FIG. 6 is a sequence diagram related to the second exemplary embodiment.

FIG. 6 illustrates an example of operation sequence for the STA 101 in the present exemplary embodiment to receive the information about the network, which is the connection destination. FIG. 6 illustrates a sequence in the case where the cableless setup network was discovered in step S505 of FIG. 5.

In step S601, in response to a user operation, the STA 101 activates the AP function to form a network with SSID of PrinterSetup as the cableless setup network. In step S602, in response to a user operation, the STA 103 forms a network with SSID of DIRECT-PrinterSetup as a cableless setup network. In step S603, the STA 101 activates the CL function in parallel to the activation of the AP function.

In the CL function, the STA 101 searches for a cableless setup network formed by another apparatus, which is the GO. If the cableless setup network has been discovered, in step S604, the STA 101 stops the AP function, and in step S605, the STA 101 connects to the STA 103 that has formed the cableless setup network. In step S606, the STA 101 acquires information about the network with SSID of DIRECT-SmartDevice from the STA 103. After acquiring the information about the connection destination in step S606, in step S607, the STA 101 disconnects from the network with SSID of DIRECT-PrinterSetup, which is the cableless setup network, and in step S608, the STA 101 stops the CL function. When the CL function is stopped by the STA 101 in step S608, in step S609, the STA 103 stops the GO that has formed the cableless setup network to close the cableless setup network. In step S610, the STA 101 activates the STA function to connect to the apparatus, which is the connection destination. In step S611, the STA 103 activates the GO to establish a connection with the STA 101, and forms a network with SSID of DIRECT-SmartDevice. In step S612, the STA 101 sets the acquired information about the connection destination, and connects to the network with SSID of DIRECT-SmartDevice.

In the second exemplary embodiment, as an example, the STA 101 activates the AP function and the CL function in parallel at the time of cableless setup to acquire the information about the network, which is the connection destination. In a third exemplary embodiment, if connection has not been established in two or more interfaces of an STA 101, an AP function and a CL function are activated in parallel. If there are not two or more interfaces in which no connection is yet established, the AP function and the CL function are activated in sequence to receive information about the connection destination, as an example.

Figure 7:
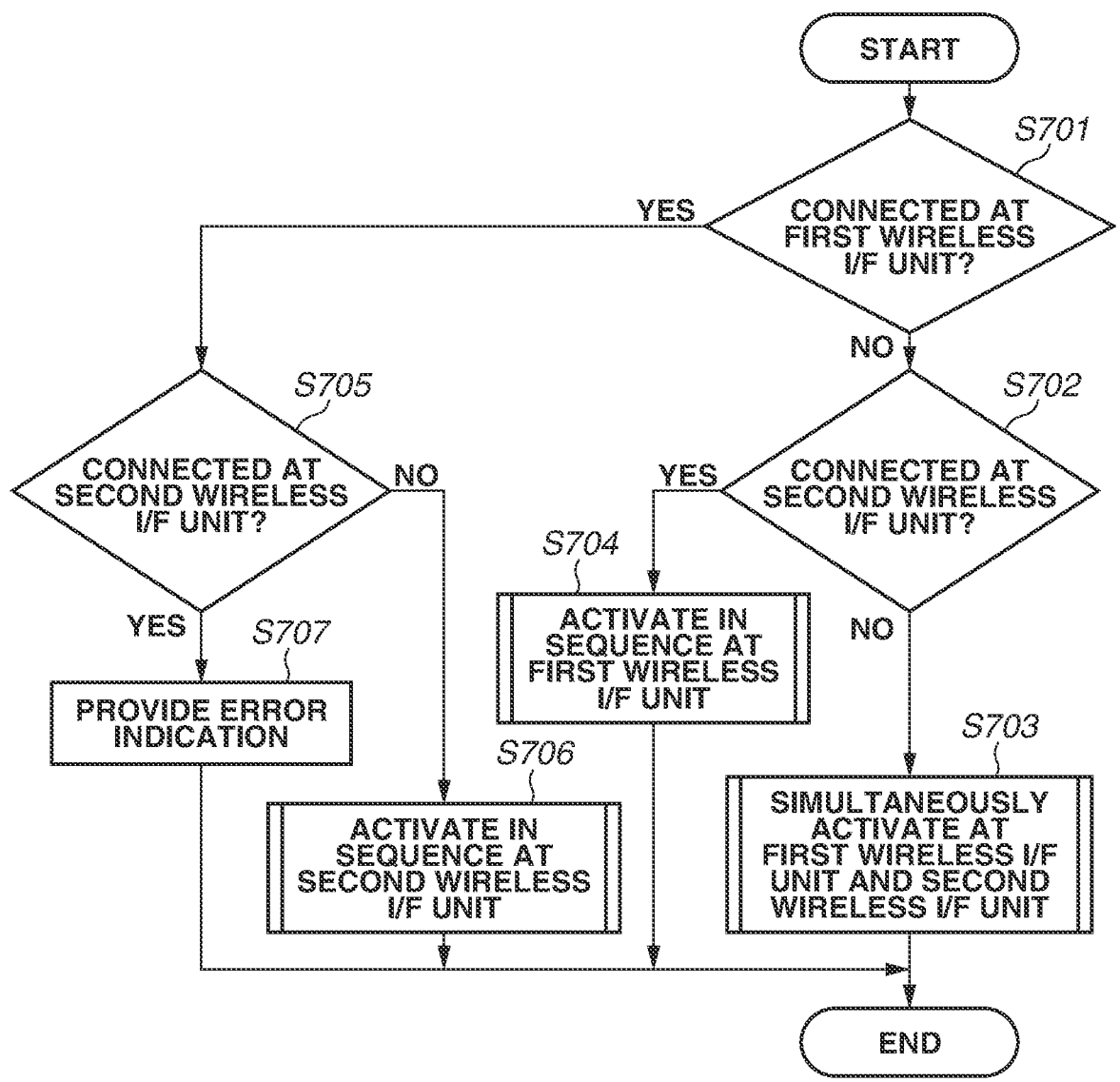
FIG. 7 is a flowchart of a process executed by a communication apparatus in a third exemplary embodiment.

FIG. 7 is a flowchart of a process performed by a control unit 206 executing a program stored in a storage unit 207 of the STA 101. The process in the flowchart is started when the user operates an input unit 202 to select a connection destination setting menu. When the process is started, in step S701, the control unit 206 determines whether a connection with the connection destination has been established at a first wireless OF unit, that is, a wireless OF unit 204.

If the control unit 206 determines in step S701 that no connection has been established (NO in step S701), in step S702, the control unit 206 determines whether a second wireless OF unit, that is, a wireless OF unit 205 has established a connection with the connection destination. If the control unit 206 determines in step S702 that no connection has been established (NO in step S702), there are two or more interfaces that can be used by the STA 101. Thus, in step S703, the control unit 206 performs the setting process described in relation to the second exemplary embodiment to acquire information about the network, which is the connection destination, using the plurality of interfaces, and the process in the flowchart is ended. In step S703, the control unit 206 activates the AP function and the CL function in parallel at the wireless OF unit 204 and the wireless OF unit 205, respectively, to acquire the information about the connection destination from the STA or GO in the cableless setup network.

On the other hand, if the control unit 206 determines in step S702 that the connection has been established (YES in step S702), in step S704, the control unit 206 performs the setting process described in relation to the first exemplary embodiment, and the process is ended. In step S704, the control unit 206 activates the AP function and the CL function in sequence at the wireless OF unit 204 so that the information about the connection destination can be acquired from the STA or GO.

If the control unit 206 determines in step S701 that the connection has been established (YES in step S701), in step S705, the control unit 206 determines whether the connection with the connection destination has been established at the wireless OF unit 205. If the control unit 206 determines in step S705 that no connection has been established (NO in step S705), there is one interface that can be used by the STA 101. Thus, in step S706, the control unit 206 uses the one interface to perform the setting process described in relation to the first exemplary embodiment, thereby to acquire the information about the network, which is the connection destination, and the process in the flowchart is ended. In step S706, the control unit 206 activates the AP function and the CL function in sequence at the wireless OF unit 205 to acquire the information about the connection destination from the STA or GO. If the control unit 206 determines in step S705 that the connection has been established (YES in step S705), in step S707, the control unit 206 provides an error indication that the setting has not been completed, and the process is ended.

According to the present exemplary embodiment, it is possible to acquire the information about the network for connection with the partner apparatus by activating the AP function and the CL function in sequence or in parallel based on the connection status of the plurality of interfaces of the communication apparatus.

In the first to third exemplary embodiments, the CL function is activated to acquire the information about the connection destination from the GO having formed the cableless setup network. However, the present disclosure is not limited to this. For example, the STA function may be activated instead of activating the CL function to acquire the information about the connection destination from the AP having formed the cableless setup network.

The STA 103 in each of the exemplary embodiments may be a printer having a printing unit. If the STA 103 operates as a printer, it is possible to print data acquired through communication with the partner apparatus, for example.

The STA 103 in each of the present exemplary embodiment may be a camera having an imaging unit. If the STA 103 operates as a camera, it is possible to transmit data captured through communication with the partner apparatus, for example.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-092798, filed Jun. 8, 2022, which is hereby incorporated by reference herein in its entirety.

What is claimed is:

1. A communication apparatus comprising:
at least one memory storing instructions; and
at least one processor that, upon execution of the instructions, is configured to:
receive a user instruction for executing a predetermined setup by the communication apparatus including concurrently executing a first function and a second function;
based on the user instruction, build a first network for performing a predetermined setting, and executing the first function to wait for connections from other communication apparatuses to the first network;
based on the user instruction, executing the second function, at a same time as the first function, to search for a second network for a predetermined setup built by other communication apparatuses;
wherein when the first function and the second function are executed concurrently,
acquire connection information from a first other communication apparatus, when, during the execution of the first function, it is determined that the first other communication apparatus has connected to the first network;
acquire connection information from a Group Owner (GO), when, during the execution of the second function, the communication apparatus has found the second network built by the GO in the searching and it is determined that the communication apparatus has connected to the second network;
disconnect the connection with the first other communication device or the GO, when the communication apparatus has acquired the connection information; and
connect to a connection destination indicated by the connection information acquired from the first other communication apparatus or the GO.

2. The communication apparatus according to claim 1, wherein the connection information is a service set identifier (SSID).

3. The communication apparatus according to claim 2, wherein a character string of the SSID of the first network includes at least a character string of PrinterSetup, and a character string of the SSID of the second network includes at least a character string of DIRECT-PrinterSetup.

4. The communication apparatus according to claim 1, wherein the communication apparatus is a printer.

5. The communication apparatus according to claim 1, wherein the connection information is information necessary for connection to a network.

6. The communication apparatus according to claim 1, wherein the predetermined setup is wireless setting of wireless infrastructure communication, and the first network and the second network are networks for performing the wireless setting of the wireless infrastructure communication.

7. The communication apparatus according to claim 1, wherein execution of the stored instructions further configures the at least one processor to stop execution of the second function when it is determined that the first other communication device has connected to the first network and stopping execution of the first function when it is determined that the communication apparatus has connected to the second network.

8. A communication method of a communication apparatus, comprising:
receiving a user instruction for executing a predetermined setup by the communication apparatus including concurrently executing a first function and a second function;

based on the user instruction, building a first network for performing a predetermined setting and executing the first function for waiting for connection of another communication apparatus to the first network built by the communication apparatus;

based on the user instruction, executing the second function, at a same time as the first function, for searching for a second network for a predetermined setup built by another communication apparatus;

controlling, the communication apparatus when the first function and the second function are executed concurrently, to acquire connection information from a first other communication apparatus when during the execution of the first function, it is determined that the first other communication apparatus has connected to the first network;

acquire connection information from a Group Owner (GO) when, during execution of the second function, the communication apparatus has found the second network build by the GO in the searching and the communication apparatus has connected to the second network;

disconnecting the connection with the first other communication apparatus or the GO when the communication apparatus has acquired the connection information; and connecting to a connection destination indicated by the acquired connection information from the first other communication apparatus or the GO.

9. A non-transitory computer-readable storage medium instructions that, when executed by one or more processors, configures a communication apparatus to perform a method, the method comprising:

receiving a user instruction for executing a predetermined setup by the communication apparatus including concurrently executing a first function and a second function;

based on the user instruction, building a first network for performing a predetermined setting and executing the first function for waiting for connection of another communication apparatus to the first network built by the communication apparatus;

based on the user instruction, executing the second function, at a same time as the first function, for searching for a second network for a predetermined setup built by another communication apparatus;

controlling, the communication apparatus;

when the first function and the second function are executed concurrently, to acquire connection information from a first other communication apparatus when during the execution of the first fuction, it is determined that the first other communication apparatus has connected to the first network;

acquire connection information from a Group Owner (GO) when, during execution of the second function, the communication apparatus has found the second network build by the GO in the searching and the communication apparatus has connected to the second network;

disconnecting the connection with the first other communication apparatus or the GO when the communication apparatus has acquired the connection information; and connecting to a connection destination indicated by the acquired connection information from the first other communication apparatus or the GO.

* * * * *